United States Patent [19]

Tanizaki et al.

[11] Patent Number: 4,570,997
[45] Date of Patent: Feb. 18, 1986

[54] SLIDING LOCK MECHANISM FOR ROTARY SEAT ASSEMBLY

[75] Inventors: Hiroyuki Tanizaki, Yokohama; Kazuma Sato, Nagoya; Kiyohiko Munakata, Yokohama; Yuzo Kanazawa, Fuwa, all of Japan

[73] Assignee: Nissan Motor Co., Ltd., Yokohama, Japan

[21] Appl. No.: 512,018

[22] Filed: Jul. 8, 1983

[30] Foreign Application Priority Data

Jul. 14, 1982 [JP] Japan ................. 57-123448

[51] Int. Cl.⁴ .............................................. A47C 3/18
[52] U.S. Cl. ................................ 297/349; 248/425; 248/429
[58] Field of Search ............... 297/349; 248/425, 429, 248/430

[56] References Cited

U.S. PATENT DOCUMENTS

| 2,809,690 | 10/1957 | Walther et al. | 248/425 |
| 3,027,131 | 3/1962 | Piccione | 248/429 |
| 3,445,143 | 5/1969 | Swenson | 248/429 |
| 3,622,202 | 11/1971 | Brown | 297/349 |
| 3,659,895 | 5/1972 | Dresden | 297/349 |
| 4,134,617 | 1/1979 | Matsubara | 297/349 |

Primary Examiner—Francis K. Zugel
Attorney, Agent, or Firm—Schwartz, Jeffery, Schwaab, Mack, Blumenthal & Evans

[57] ABSTRACT

A sliding lock mechanism for a rotary seat assembly includes an operating lever which rotates together with a seat of the assembly, thereby eliminating any operating lever projecting from the back of the seat.

6 Claims, 8 Drawing Figures

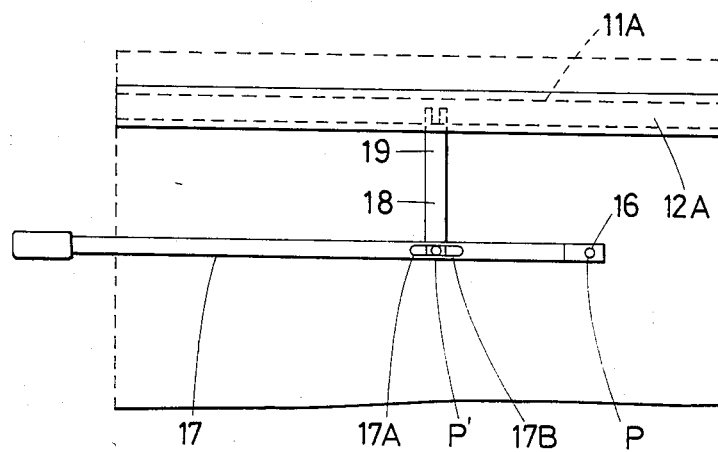

SLIDING LOCK MECHANISM FOR ROTARY SEAT ASSEMBLY

BACKGROUND OF THE INVENTION

The present invention relates to a sliding lock mechanism for a rotary seat assembly used in an automobile and the like, particularly a lock mechansim having an operating lever projecting only forward of the seat in the assembly.

A conventional seat e.g. for an automobile is intended to be slidable and rotatable. A slidable and rotatable seat assembly as shown in FIG. 1 is comprised by a pair of rails (1)A and (1)B mounted on the floor (10) of the automobile, a pair of leg portions (2)A and (2)B mounted to the lower surface of a lower base of a seat (5) and slidably fitted to the rails (1)A and (1)B, thereby providing the lower base (2) in a slidable relationship with the floor (10), in addition, an annular ring rail (3) affixed to the upper surface of the lower base (2) and provided with a rail groove (3)A in which the periphery of a leg portion (4)A mounted to the lower surface of an upper base (4) is fitted so as to install the upper base (4) rotatably on the lower base (2), and the seat (5) being affixed to the upper surface of the upper base (4) through a frame (5)A.

In such a construction, a conventional sliding lock mechanism would be, as shown in FIGS. 1 and 2, comprised by support shafts (6)A and (6)B depending from the lower surface of the lower base (2), operating levers (7)A and (7)B respectively rotatably mounted to the support shafts (6)A and (6)B, a connecting lever (8) pivotally affixed to the connected ends of the operating levers (7)A and (7)B, and a lock pin (9) connected to the end of the connecting lever (8), whereby the lock pin (9) is inserted into one of a plurality of holes (10)A formed in series in the inner wall of rail (1)B and into a hole (10)B formed in the inner wall of the corresponding leg portion (2)B so as to lock the leg portions (2)A and (2)B in place with respect to the rails (1)A and (1)B, wherein when the seat (5) is faced forward, the operating lever (7)A is used to insert and withdraw the lock pin (9) into and from the hole (10)A of the rail (1)B and the hole (10)B of the leg portion (2)B, while when the seat is faced backward, the operating lever (7)B is used to insert and withdraw the lock pin (9) into and from the holes (10)A and (10)B.

In the construction, however, the operating lever (7)A or (7)B projecting from the back of the seat (5) as shown in FIG. 3 may injure a leg of a passenger on the rear seat and cause other troubles.

Accordingly, a primary object of the present invention is to provide a rotary seat assembly to overcome the drawbacks of the prior construction mentioned above.

Another object of the present invention is to provide a sliding lock mechanism to rotate an operating lever together with the rotation of the seat so as to position the operating lever always forward of the seat.

SUMMARY OF THE INVENTION

The present invention, in accordance with one embodiment thereof, is incorporated in a rotary seat assembly comprising rails mounted on the floor of an automobile, a lower base having a lower surface to which leg portions are mounted in a slidable fitting relation with the rails, an upper base rotatably mounted on the lower base, and a seat mounted on the upper base, and comprises an operating means provided adjacent to the upper base and connected to a lock means to lock the sliding movement of the leg portions relative to the rails, wherein in the condition where the leg portions are locked by the lock means, the operating means and the lock means are rotatably connected to each other on the rotation centerline of the upper base. Accordingly, it is possible to use regardless of the direction of the seat an operating lever positioned forward of the seat to lock the sliding movement of the seat.

BRIEF DESCRIPTION OF THE DRAWINGS

FIG. 8 is a partial plan view of an operating means and a lock means in another embodiment according to the present invention.

DESCRIPTION OF THE PREFERRED EMBODIMENT

Figure 1:
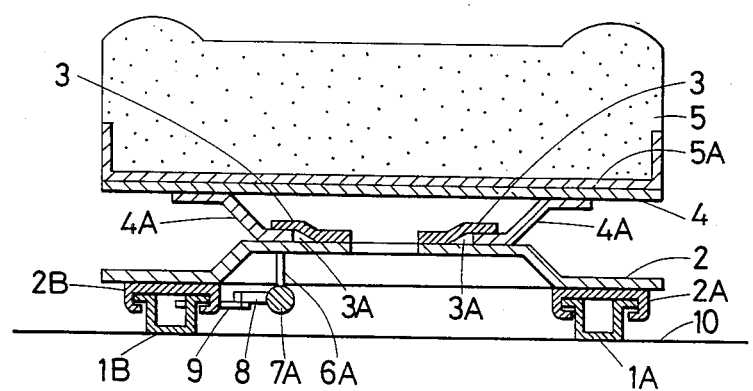
FIG. 1 is a cross sectional view as referenced from the forward side of a conventional rotary seat assembly.
Figure 2:
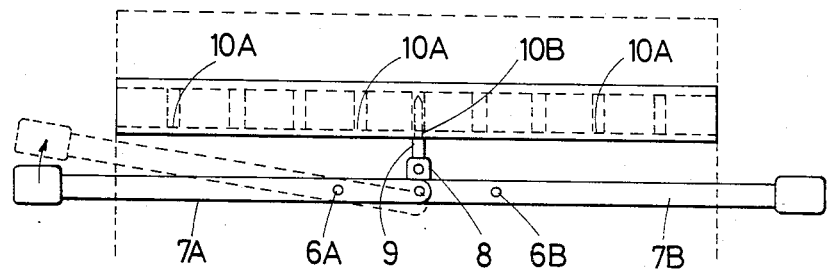
FIG. 2 is a partial plan view showing leg portions and operating levers.
Figure 3:
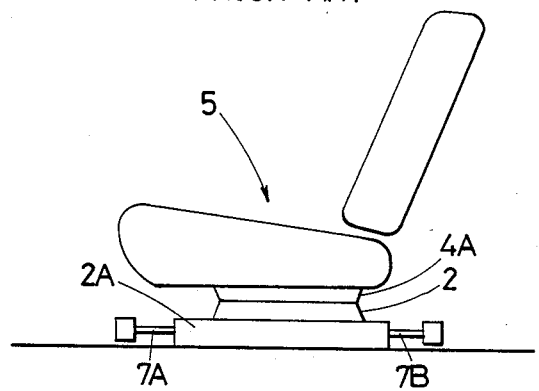
FIG. 3 is a side elevational view of the conventional rotary seat assembly.
Figure 4:
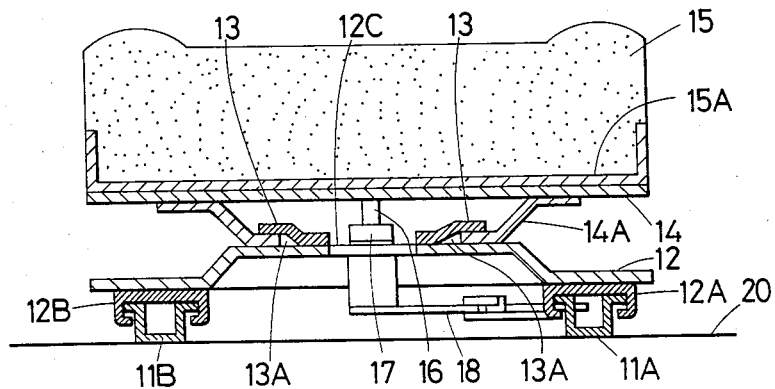
FIG. 4 is a cross sectional view as referenced from the forward side of a rotary seat assembly according to the present invention.
Figure 5:
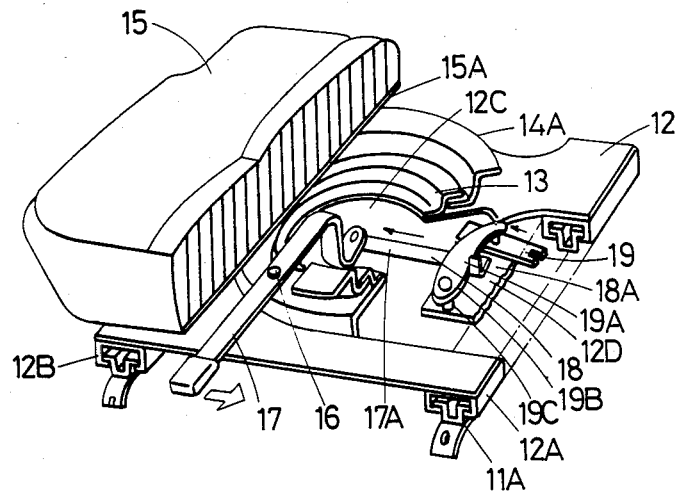
FIG. 5 is a partially cut-away perspective view of a lock mechanism incorporating the present invention.

Referring to FIG. 4 shown in one embodiment of the present invention, a pair of rails (11)A and (11)B are mounted on the floor (20) of an automobile, and a pair of leg portions (12)A and (12)B are mounted to the lower surface of a lower base (12) in slidable fitting relation with the rails (11)A and (11)B, whereby the lower base (12) is slidably mounted on the floor. The lower base is provided with an opening (12)C at the central portion thereof and formed with an annular ring rail (13) on the upper surface thereof, the ring rail being provided with a rail groove (13)A into which the periphery of the leg portion (14)A affixed to the lower surface of an upper base is fitted, whereby the upper base (14) is rotatably installed relative to the lower base (12). The frame (15)A of the seat (15) is affixed to the upper surface of the upper base (14).

In a sliding lock mechanism for the construction as mentioned above, a support shaft (16) depends from the lower surface of the upper base (14), and an operating lever (17) is rotatably connected to the lower end of the support shaft (16) for the center P of rotation and has the forward end portion thereof projected forward from the seat (15). Rotatably connected to the other end (17)A of the operating lever (17) is a connecting lever (18) which is at the other end thereof formed with a claw member (18)A. The claw member (18)A is engaged with a pivotal lever (19)A at the outside thereof which is pivotally connected to a bracket (12)D extending from the leg portion (12)A. A lock pin (19) is connected to the pivotal lever (19)A.

Figure 6:
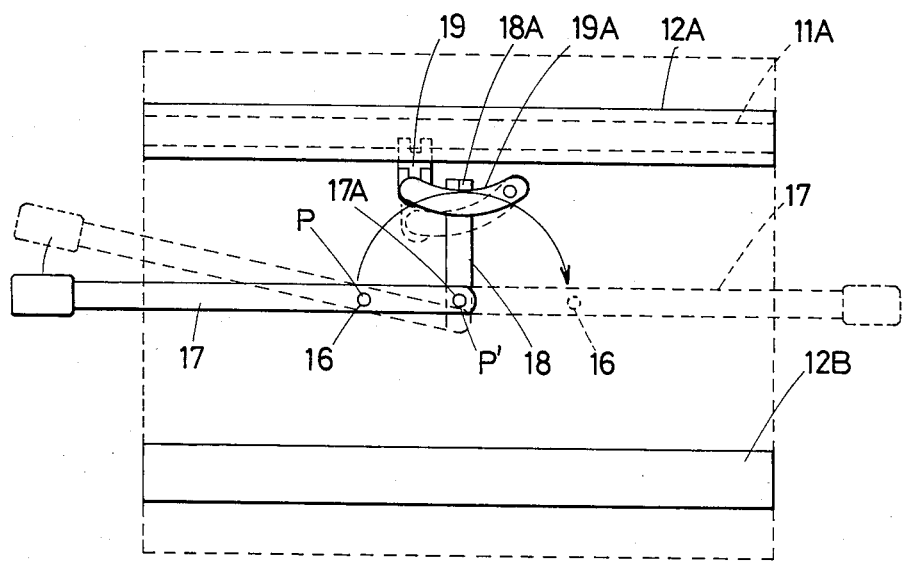
FIG. 6 is a plan view of an operating means and a lock means according to the present invention.
Figure 7:
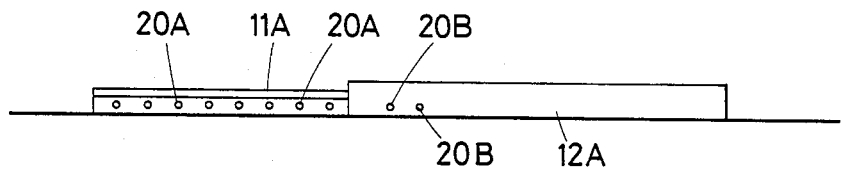
FIG. 7 is a partially cut-away side elevational view of a leg portion and a rail according to the present invention.

In the construction mentioned above, the operating lever (17) for an operating means rotates together with the seat (15) while the connecting lever (18), the pivotal lever (19)A and the lock pin (19) which form conjointly a lock means do not rotate together with the seat (15). The connecting point (17)A of the connecting lever (18), that is, the connecting point between the operating means and the lock means coincides with the rotation center of the seat (15) or the rotation center P' of the upper base (14) when the sliding movement of the seat (15) is locked. A plurality of holes (20)A for adjusting the position of the seat are juxtaposed on the inner wall of one rail (11)A while a pair of holes (20)B are provided in the corresponding leg portion (12)A, wherein the leg portions (12)A and (12)B can be slided relative to the rails (11)A and (11)B to have the holes (20)A and (20)B mate with one of the combinations of two holes (20)A so as to insert the bicuspid end of the lock pin(19) into the holes (20)A and (20)B whereby the leg portion (12)A can be locked at a predetermined position relative to the rail (11)A. In this condition, the pivotal lever (19)A is biased by a spring (19)C mounted around the pivotal shaft (19)B in a direction of the insertion of the lock pin (19) into the holes (20)A and (20)B. When the operating lever (17) is rotated against the force of the spring (19)C to the position as shown by dotted lines in FIG. 6, the lock pin (19) can be stripped from the holes (20)A and (20)B so that the leg portion (12)A is slidable relative to the rail (11)A. When the seat (15) is rotated 180 degrees, in other words, the upper base (14) is rotated 180 degrees relative to the lower base (12) with the leg portion (12)A being in a locked condition by the lock pin (19), in other words, with the sliding movement of the seat (15) being locked, the operating means or the operating lever (17) is also rotated 180 degrees in the direction as shown by the arrow. The lock means comprising the connecting lever (18), the pivotal lever (19)A and the lock pin (19) is unchanged in position because the rotation center P' is coincident with the connecting point (17)A between the connecting lever (18) on the lock means side and the operating lever (17) when the seat (15) is placed in the slide lock condition.

The present invention should not limited to the embodiment set forth above. For instance, the rotation center P of the operating lever (17) may be located opposite to the forward end of the operating lever (17) with respect to the rotation center P' of the seat as shown in FIG. 8. In addition, the connecting point (17)A may be movable in position through an elongated hole (17)B of the operating lever (17).

What is claimed is:

1. In a rotary seat assembly comprising rails mounted on a floor, a lower base having leg portions on the lower surface thereof, said leg portions being slidably fitted to the rails, an upper base rotatably mounted on said lower base, a seat mounted on said upper base and a sliding lock mechanism for said rotary seat assembly comprising a lock means to lock the sliding movement of the leg portions relative to said rails and an operating means connected to said lock means, said sliding lock mechanism characterized in that said operating means is mounted to said upper base to provide said lock means with a substantially horizontal movement and that the location where the operating means is rotatably connected to said lock means is positioned on the substantially vertical rotation centerline of said upper base when said lock means is positioned to lock said leg portions;

wherein said operating means has an operating lever which is connected to said upper base at a first location to substantially horizontally rotate about said first location and is connected to said lock means at a second location to substantially horizontally operate said lock means, and wherein said second location is positioned on the substantially vertical rotation centerline of said upper base when said lock means is positioned to lock said leg portions.

2. The sliding lock mechanism of claim 1, wherein said operating lever has one end portion thereof projected from the seat and the other portion thereof rotatably connected to a connecting lever which is associated with said lock means, and an intermediate portion thereof rotatably connected to a support shaft depending from the lower surface of the upper base.

3. The sliding lock mechanism of claim 2, wherein the connecting location between the operating lever and the connecting lever moves along a locus which intersects with the substantially vertical rotation axis of the upper base when said lock means is positioned to lock said leg portions.

4. The sliding lock mechanism of claim 3, wherein when said seat is rotated 180 degrees with the sliding movement of said seat being locked, said operating lever is also rotated 180 degrees together with said seat and said lock means is kept stationary.

5. The sliding lock mechanism of claim 1, wherein said operating lever has one end portion thereof projected from the seat and the other end portion thereof rotatably connected to a support shaft depending from the lower surface of the upper base, and an intermediate portion thereof rotatably connected to a connecting lever which is associated with said lock means.

6. The sliding lock mechanism of claim 5, wherein the connecting location between the operating lever and the connecting lever moves along a locus which intersects the substantially vertical rotation axis of the upper base when said lock means is positioned to lock said leg portions.

* * * * *